US012681458B2

(12) United States Patent
Mukherjee et al.

(10) Patent No.: US 12,681,458 B2
(45) Date of Patent: Jul. 14, 2026

(54) POWER MANAGEMENT OF EDGE DEVICES TO MAINTAIN MINIMUM TEMPERATURE COMPLIANCE

(71) Applicant: DELL PRODUCTS L.P., Round Rock, TX (US)

(72) Inventors: Rishi Mukherjee, Bangalore (IN); Sivakumar Swamy, Bangalore (IN); Ravishankar K N, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 352 days.

(21) Appl. No.: 18/475,626

(22) Filed: Sep. 27, 2023

(65) Prior Publication Data

US 2025/0103026 A1 Mar. 27, 2025

(51) Int. Cl.
*G05B 19/00* (2006.01)
*G05B 19/4155* (2006.01)

(52) U.S. Cl.
CPC .................... *G05B 19/4155* (2013.01); *G05B 2219/50333* (2013.01)

(58) Field of Classification Search
None
See application file for complete search history.

(56) References Cited

U.S. PATENT DOCUMENTS

| | | | |
|---|---|---|---|
| 10,296,060 B2 | 5/2019 | Shabbir et al. | |
| 2018/0314774 A1 | 11/2018 | Khosrowpour et al. | |
| 2022/0026880 A1 * | 1/2022 | Embleton | G05D 22/02 |
| 2022/0334874 A1 | 10/2022 | Katiyar et al. | |
| 2023/0042338 A1 | 2/2023 | Kanakapura et al. | |
| 2023/0305608 A1 * | 9/2023 | Kono | G06F 9/4893 |

* cited by examiner

*Primary Examiner* — Paul B Yanchus, III
(74) *Attorney, Agent, or Firm* — Larson Newman, LLP

(57) ABSTRACT

An information handling system monitors an edge device to detect whether a current temperature of the edge device is below a minimum system temperature threshold. If the current temperature is below the minimum system temperature threshold, then the system determines whether the edge device includes a heater. If a current system workload of the edge device is greater than a minimum system workload threshold and the heater is healthy, then the system uses the heater to increase the current temperature of the edge device to the minimum system temperature threshold.

20 Claims, 6 Drawing Sheets

Information Handling System 305-1

Sensor 310-1

Heater 315-1

Heater Controller 320-1

Workload 325-1

Processor 330-1

Information Handling System 305-2

Sensor 310-2

Heater 315-2

Heater Controller 320-2

Workload 325-2

Processor 330-2

Network 390

Management Console 350

System Thermal Controller 340

Event Processing System 345

Internet of Things Device 360

Heater 375

Workload 370

POWER MANAGEMENT OF EDGE DEVICES TO MAINTAIN MINIMUM TEMPERATURE COMPLIANCE

FIELD OF THE DISCLOSURE

The present disclosure generally relates to information handling systems, and more particularly relates to power management of edge devices to maintain minimum temperature compliance.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system monitors an edge device to detect whether a current temperature of the edge device is below a minimum system temperature threshold. If the current temperature is below the minimum system temperature threshold, then the system determines whether the edge device includes a heater. If a current system workload of the edge device is greater than a minimum system workload threshold and the heater is healthy, then the system uses the heater to increase the current temperature of the edge device to the minimum system temperature threshold.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
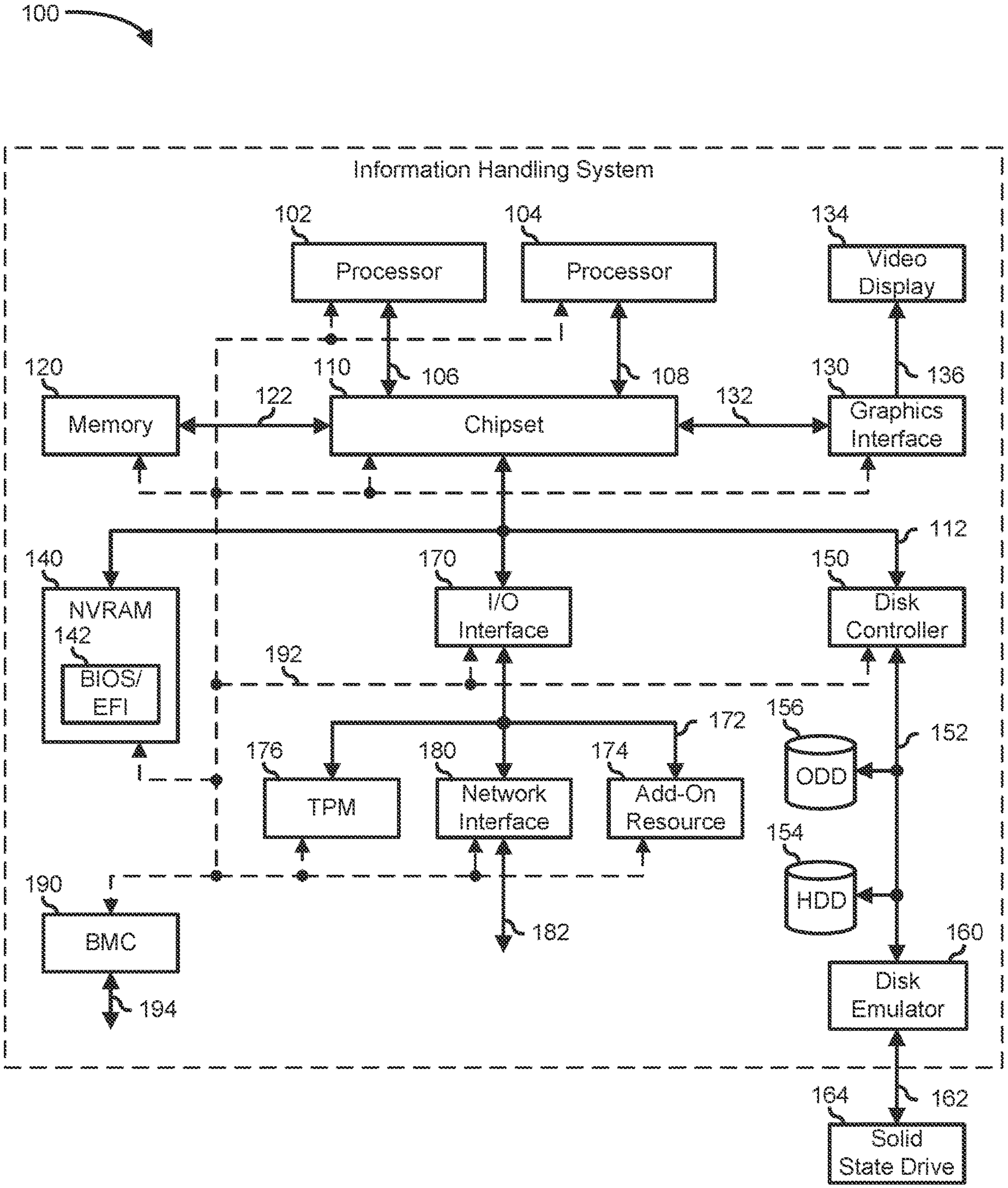
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include a $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

American Society of Heating, Refrigerating, and Air-conditioning Engineers (ASHRAE) defines four classes of data center equipment: A1, A2, A3, and A4. Class A1 equipment operates from 15° C. to 32° C. Class A2 equipment operates from 10° C. to 35° C. Class A3 equipment operates from 5° C. to 40° C. Class 4 equipment operates from 5° C. to 45° C. at 8% to 85% relative humidity. With edge computing, data is being handled, processed, and delivered at edge site operations and are becoming as hands-off as possible. Edge devices typically have a heater element to maintain the ASHRAE recommended minimum operating temperature. Accordingly, the usage of the heater element adds to the overall power requirement of the system. For example, an edge server may be running in an industrial environment instead of a data center and may need a heater instead of a cooler or both.

The power consumption of these edge devices is normally quite high, which should be optimized while adhering to the ASHRAE thermal recommendations. In addition, heater elements are typically inefficient as it provides heat using the convection principle which uses air as a medium to heat targeted components. Moreover, the absence of the heater element or a malfunction of the heater element can lead to a violation of the ASHRAE recommended lower temperature limit. It is advantageous to determine how to address these and other issues autonomously to maintain the ASHRAE thermal recommendations for edge devices while optimizing power usage even when the heater element is in an unhealthy state. Accordingly, the present disclosure provides a non-intrusive mechanism of identifying whether the applicable ASHRAE thermal recommendations are maintained and deviation from temperature lower limits be addressed by activating a workload that consumes optimal energy to achieve the recommended minimum temperature.

Figure 2:
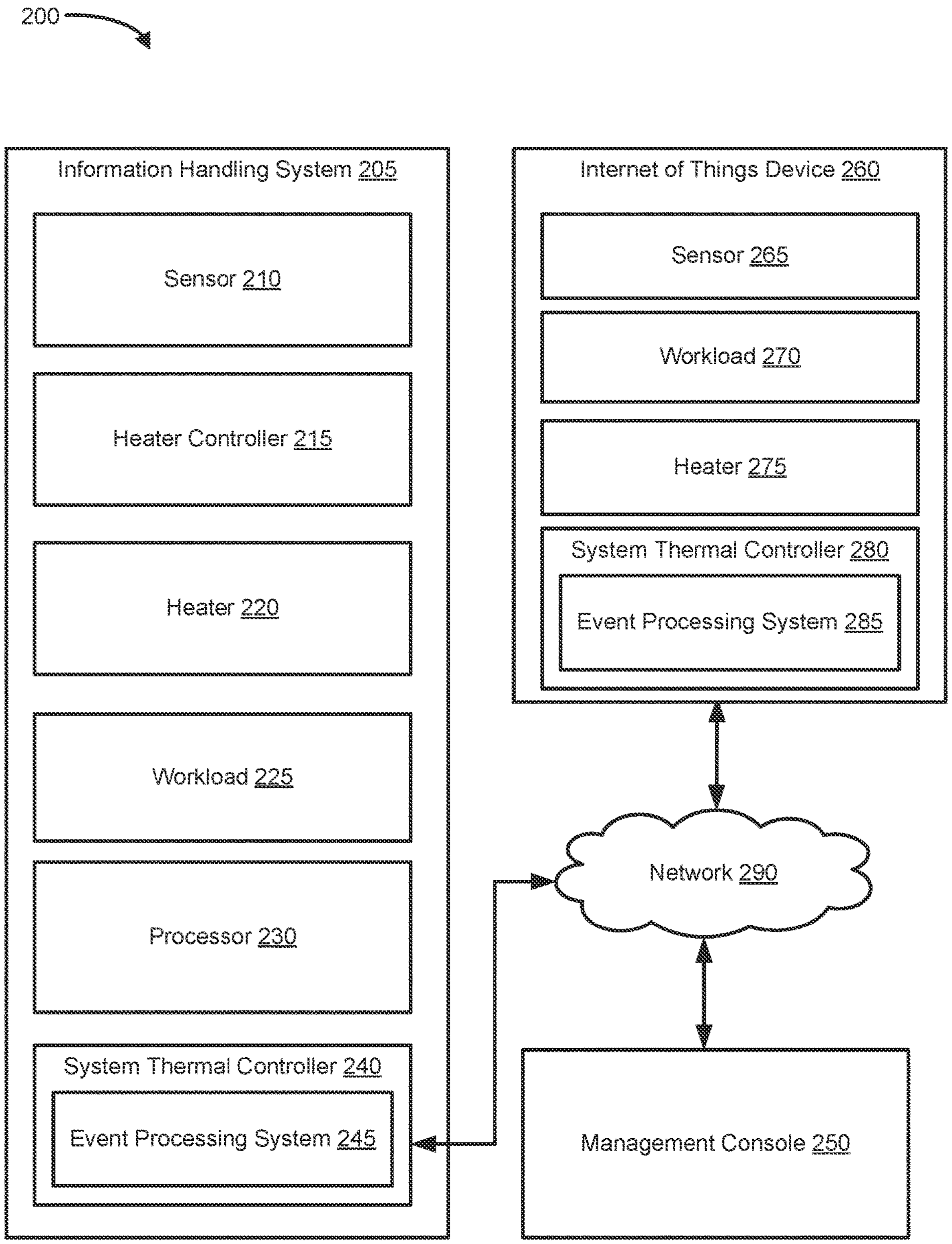
FIGS. 2 and 3 are block diagrams of computing environments for power-optimized, autonomous management of edge devices to maintain minimum temperature compliance, according to an embodiment of the present disclosure.

FIG. 2 shows a computing environment 200 for power-optimized, autonomous management of edge devices to maintain minimum temperature compliance. The compliance may be based on ASHRAE minimum temperature specification. Computing environment 200 includes an information handling system 205, a network 290, a management console 250, and an Internet of Things (IoT) device 260. Information handling system 205, which is similar to information handling system 100 of FIG. 1 includes a sensor 210, a heater controller 215, a heater 220, a workload 225, a processor 230, and a system thermal controller 240 which further includes an event processing system 245. IoT device 260 includes a sensor 265, a workload 270, a heater 275, and a system thermal controller 280 which further includes an event processing system 285. Workloads 225 and 270 may be a dummy workload or an actual workload of information handling system 205 or IoT device 260.

Computing environment 200 may be an edge computing environment that includes one or more edge devices which include IoT devices and local edge servers, such as IoT device 260 and information handling system 205. IoT device 260 may be one of an inter-networking of "things" or objects that promotes the collection and exchange of data among those objects. IoT device 260 and information handling system 205 may be remotely monitored and managed by management console 250. In one example, the management console can be in communication with system thermal controller 240 and system thermal controller 280. Management console 250 may also be in communication with heater controller 215 and a management controller which is similar to BMC 190 of FIG. 1.

The edge devices may be exposed to environmental elements unlike servers in data centers for example. Accordingly, there may be times wherein environmental conditions may require heat to be applied. In one or more embodiments, the present disclosure may autonomously provide heat to information handling system 205 and IoT device 260. For example, a heating system and/or a dummy workload may be utilized to apply heat until thermal requirements are met via heater 220 and heater 275 to information handling system 205 and IoT device 260 respectively. Heaters 220 and 275 can comprise a heating element, a heatsink wrapped in a thin film, wherein the film comprises a resistive heater coupled with a power output, or similar. Heater controller 215 may be configured to monitor, manage, and/or control heater 220. For example, the heater controller may be configured to send an alert and/or trigger an event when it detects a deviance in recommended temperature thresholds. A similar heater controller may also be included in IoT device 260. In another embodiment, system thermal controller 280 may be configured to monitor, manage, and/or control heater 275.

Information handling system 205 and IoT device 260 may include one or more sensors, such as sensor 210 and sensor 265 respectively. Sensor 210 and sensor 265 may be any type of device used to monitor conditions, such as temperature, accelerations, current, power consumption, pressure, orientation, etc. at one or more physical locations within information handling system 205 and IoT device 260 respectively. In one or more embodiments, one or more alerts and/or events may be generated based at least on one or more temperature values. One or more alerts and/or events may be generated based at least on one or more deviations from one or more temperature ranges. For example, an alert and/or event may be generated when the temperature of information handling system 205 reaches below a minimum temperature threshold.

System thermal controller 240 may be a software agent that is deployable on a host operating system or at a remote management console, such as management console 250. System thermal controller 240 can orchestrate between one or more of the following modules or considerations in deciding how to autonomously maintain an appropriate recommended minimum threshold, such as an ASHRAE recommended minimum temperature threshold, a manufacturer recommended minimum temperature threshold, a user recommended minimum temperature threshold, etc. One of the considerations includes a user-configurable maximum workload threshold beyond which the dummy workload may not be added to the system. Another consideration may be the current runtime thermal state with respect to the system power usage which may be based on telemetry data. An additional consideration is the critical heater hardware alert and/or event intercepted. For example, for class A1 equipment, system thermal controller 240 may intercept an alert or event when the temperature of the equipment dips below 15° C. In addition, system thermal controller 240 may consider the type and/or number of the alerts and/or events intercepted by the event processing system. For example, system thermal controller 240 may determine whether the event intercepted is informational or a critical alert. This may give system thermal controller 240 information about the current health of the system. Further, system thermal controller 240 may also consider the size of a parametrized dummy workload to maintain the recommended thermal condition.

For example, system thermal controller 240 may use a thermal policy to determine whether to follow a particular module or consideration to address deviance in the temperature in response to an alert and/or event. The thermal policy may also include a user-configurable maximum workload limit beyond which workload 225 may not be added to the system. The thermal policy may also consider a runtime state of information handling system 205 with respect to system power usage according to telemetry data. An event processing system 245 may be configured to intercept one or more particular alerts or events, such as a critical heater element hardware alert. For example, event processing system 245 may intercept an alert and/or event triggered when a current temperature is lower than the recommended minimum threshold.

Workload 225 may be configured as a parametrized dummy workload to maintain a recommended minimum thermal condition. For example, workload 225 may be used to adjust server utilization rates which may then increase the temperature of information handling system 205 or a section thereof to maintain or reach an appropriate recommended temperature. Similarly, workload 270 may be used to adjust the performance of IoT device 260 which may also then increase the temperature of IoT device 260. Workloads 225 and 270 may be stored locally in a memory of information handling system 205 or IoT device 260 or stored remotely and be loaded at runtime via network 290. Network 290 may be a public network, such as the Internet, a physical private network, a wireless network, a virtual private network (VPN), or any combination thereof.

The size of a dummy workload to be loaded or executed may be based on one or more factors, such as a current load or stress condition of the information handling system or IoT device. For example, system thermal controller 240 may consider the load factor of information handling system 205 when determining whether to activate heater 220 and/or add load workload 225 to processor 230. The dummy workload may include a set of messages, telemetry data, firmware, software, or applications that may be loaded, transmitted, or executed using one or more resources at information handling system 205, IoT device 260, or other devices, such as an input/output bandwidth, processor 230, a DIMM, an SSD, a graphics processing unit, a network adapter, etc. Processor 230 may be similar to processor 102 or processor 104 of FIG. 1.

System thermal controller 240 may be configured to infer, based on one or more thermal policies, a power usage to maintain or attain the recommended minimum temperature of information handling system 205. The inference may also be based on the current load, stress, and/or thermal conditions among other factors. Based on the inference, system thermal controller 240 may determine whether to utilize heater 220 and/or workload 225 or a portion thereof according to a user-configurable maximum workload threshold. For example, system thermal controller 240 may determine the size of workload 225 and/or workload 270 or a portion thereof to be executed or loaded, such that a total current workload is within the maximum system workload threshold of information handling system 205 and IoT device respectively. These considerations are taken to impose a limit to avoid overloading and/or overheating the system that the system can withstand to avoid damaging the system and its heating element among other issues.

The total current workload of information handling system 205 or IoT device 260 includes the dummy workload and/or load associated with activating heater 220 or heater 275 may not exceed the maximum system workload threshold. Accordingly, a total power consumption of information handling system 205 and IoT device includes power consumption associated with executing workload 225 and workload 270 respectively. In addition, the total power consumption includes the power consumed when activating heater 220 and heater 275. The total power consumption of information handling system 205 may not exceed the maximum power consumption threshold of information handling system 205. Similarly, the total power consumption of IoT device 260 may not exceed the maximum power consumption threshold of IoT device 260. Further, activation of heater 220 and heater 275 may be based on the current health of heater 220 and heater 275 respectively and may not violate one or more setting regulations.

Table 1 below shows correlations between the current load or the stress of processor 230 of information handling system 205 with the power usage and operating temperature. The current load or the stress shown includes one or more software, firmware, application, and/or dummy workload currently running among others. For example, a zero to 10% load may be associated with an inlet temperature of T11, an outlet temperature of T12, and power usage of P1, wherein the value of T11 may be less than the value of T12. A load of 10% to 20% may be associated with an inlet temperature of T21, an outlet temperature of T22, and power usage of P2. The inlet temperature refers to the ambient temperature of the system. The outlet temperature refers to the heat generated inside the system. The power usage also referred to as power consumption may be associated with associated with the power consumption in watts at the specified load. T11, T12, T21, and T22 may be temperature values in Fahrenheit, Celsius, Kelvin, or similar. T21 may be greater than T11 and T22 may be greater than T12. P1 may be less in value than P2. P1 and P2 may be specified by the system vendor.

Table 2 below shows correlations between various settings of heater 220 and its operating temperature and power usage. For example, a low setting may be associated with an inlet temperature of T11, an outlet temperature of T12, and a power heater usage of PH1. A medium setting may be associated with an inlet temperature of T21, an outlet temperature of T22, and a power heater usage of PH2. A high setting may be associated with inlet temperature T31, outlet temperature T32, and power heater usage PH3. T11 may be less than T21 which is less than T31. T12 may be less than T22 which is less than T32. Accordingly, PH1 may be less than PH2 which is less than PH3. Heater settings may be user configurable. For example, there may be more or less than the three settings shown. The inlet temperature, outlet temperature, power usage, and power heater usage at various loads and heater settings may be taken into consideration by system thermal controller 240. For example, the power heater usage in relation to the maximum power consumption threshold of the system may be taken into consideration when determining heater settings. The correlations depicted in tables 1 and 2 may be based on historical data, vendor recommendations, recommendations by ASHRAE or other governing bodies, etc.

TABLE 1

| Load | Inlet Temperature | Outlet Temperature | Power Usage |
|---|---|---|---|
| 0-10% | T11 | T12 | P1 |
| 10%-20% | T21 | T22 | P2 |

TABLE 2

| Heater Settings | Inlet Temperature | Outlet Temperature | Power Heater Usage |
|---|---|---|---|
| Low | T11 | T12 | PH1 |
| Medium | T21 | T22 | PH2 |
| High | T31 | T32 | PH3 |

The components of computing environment 200 may be implemented in hardware, software, firmware, or any combination thereof. The components shown are not drawn to scale and computing environment 200 may include additional edge devices. For example, computing environment 200 may include more than one information handling system, IoT device, and management console, wherein each one may include additional or fewer components. In addition, connections between components may be omitted for descriptive clarity. Further, information handling system 205, IoT device 260, and management console 250 may or may not be geographically co-located.

Figure 3:
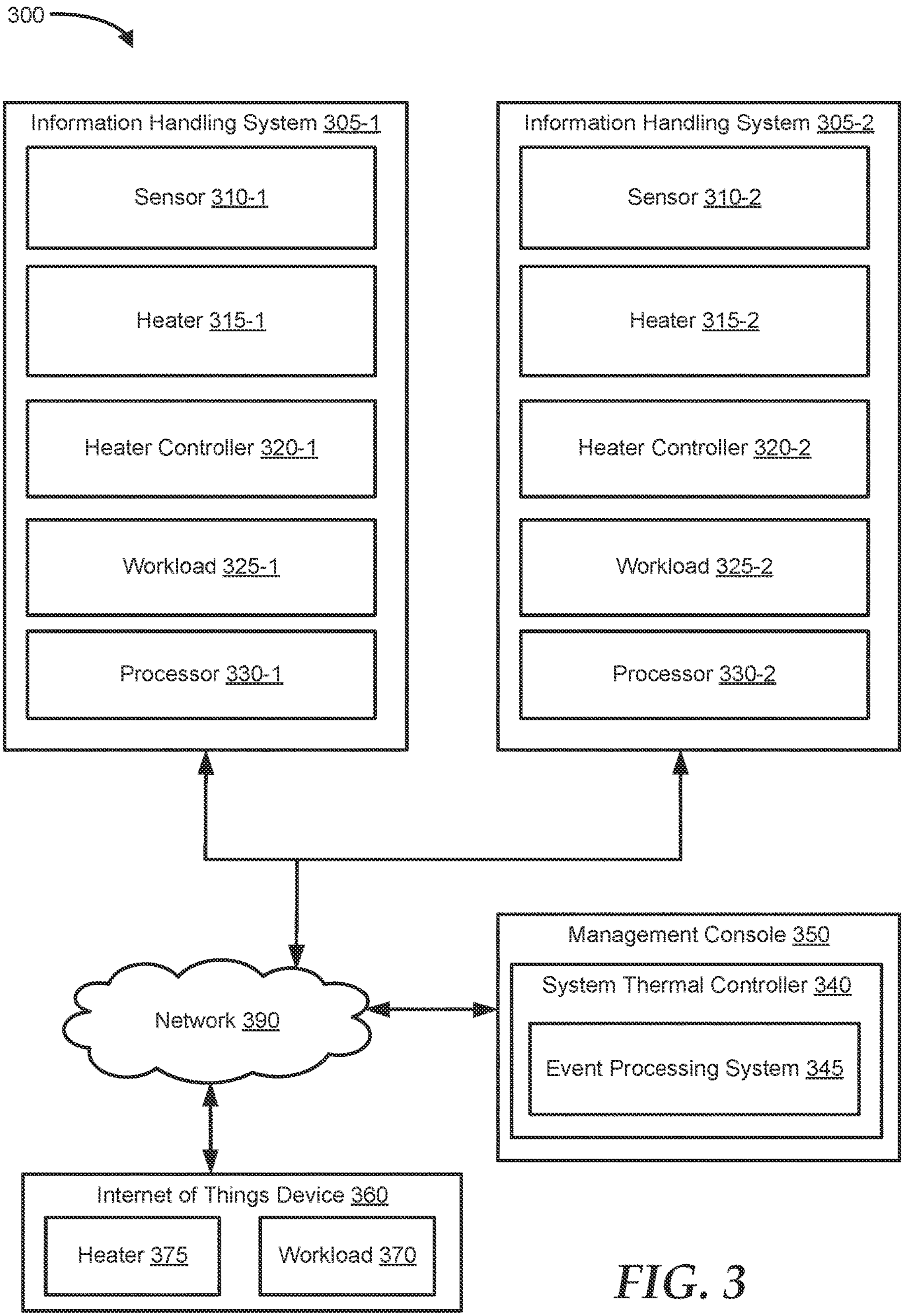

FIG. 3 shows a computing environment 300 for power-optimized, autonomous management of edge devices to maintain minimum temperature compliance. Computing environment 300 includes information handling systems 305-1 and 305-2, a network 390, a management console 350, and an IoT device 360. Information handling system 305-1 includes a sensor 310-1, a heater 315-1, a heater controller 320-1, a workload 325-1, and a processor 330-1. Information handling system 305-2 includes a sensor 310-2, a heater 315-2, a heater controller 320-2, a workload 325-2, and a processor 330-2. IoT device 360 includes a heater 375 and a workload 370. Management console 350 includes a system thermal controller 340 which further includes an event processing system 345.

Information handling systems 305-1 and 305-2 are similar to information handling system 205 of FIG. 2. Sensor 310-1 and sensor 310-2 are similar to sensor 210 and sensor 265 of FIG. 2. Heater 315-1 and heater 315-2 are similar to heater 220 of FIG. 2. Workload 325-1 and workload 325-2 are similar to workload 225 of FIG. 2. Processor 330-1 and processor 330-2 are similar to processor 230 of FIG. 2. IoT device 360 is similar to IoT device 260 of FIG. 2. Heater 375 is similar to heater 275 of FIG. 2. Workload 370 is similar to workload 270 of FIG. 2. Management console 350 is similar to management console 250 of FIG. 2. Network 390 is similar to network 290 of FIG. 2. Accordingly, computing environment 300 may be similar to computing environment 200. However, instead of the system thermal controller being located in the information handling system or IoT device, the system thermal controller is located in the management console. However, the functionality of both system thermal controllers may be similar. Accordingly, the system and functionality discussed in computing environment 200 is similar to computing environment 300.

Those of ordinary skill in the art will appreciate the configuration, hardware, and/or software components of computing environment 200 depicted in FIG. 2, and computing environment 300 depicted in FIG. 3 may vary. For example, the illustrative components within computing environment 200 and computing environment 300 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 4:
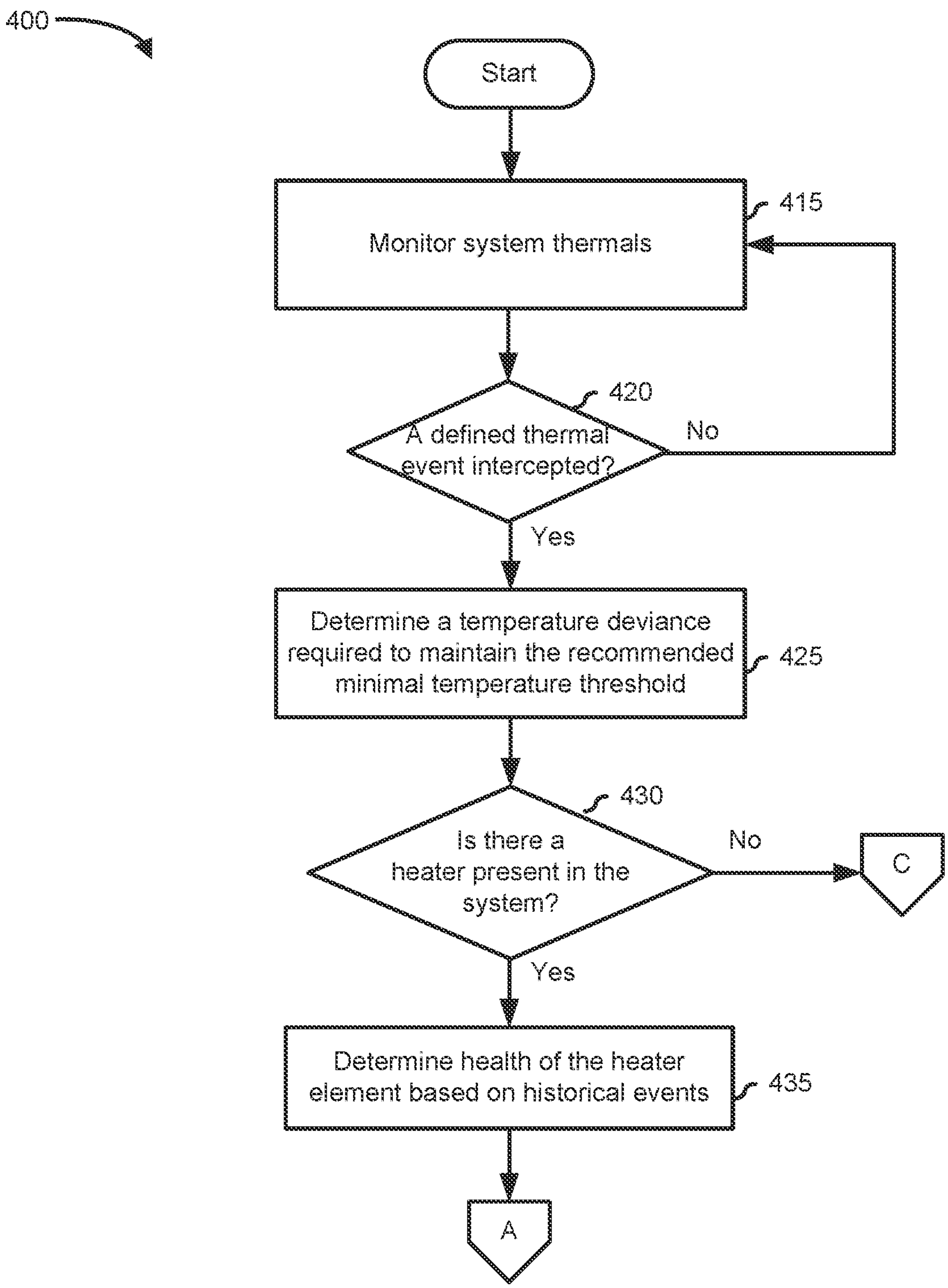
FIGS. 4, 5, and 6 are flowcharts illustrating methods for dynamic remote power management of information handling systems via a network port, according to an embodiment of the present disclosure.

FIG. 4 shows a flowchart of a method 400 for power management of edge devices to maintain minimum temperature compliance. Method 400 may be performed by one or more components of computing environment 200 of FIG. 2 or computing environment 300 of FIG. 3. However, while embodiments of the present disclosure are described in terms of computing environment 200 of FIG. 2 or computing environment 300 of FIG. 3, it should be recognized that other systems may be utilized to perform the described method. One of skill in the art will appreciate that this flowchart explains a typical example, which can be extended to advanced applications or services in practice.

Method 400 may be used to determine an optimal power usage to maintain or attain a minimum temperature threshold of a particular system or device. Determining optimal power usage includes deciding whether to use a heating element, if available and healthy, a workload, or a combination of both. One of the goals of method 400 is to utilize minimum power consumption to attain the minimum temperature threshold. Prior to the start of method 400, a user may configure one or more parameters and/or thermal policies that may be utilized by the system thermal controller.

In one embodiment, the user may define one or more thermal policies to raise one or more events if a recommended minimal temperature threshold is violated, wherein a current system temperature is below the minimal temperature threshold. In addition, the thermal policy may also state that another event may be raised when the current system temperature reaches or is above the minimal temperature threshold. The user may also define a maximum system workload threshold beyond which an additional workload may not be executed. In one example, the maximum system workload threshold may be set to 75%-80% of a CPU load. If a current system workload is at 75% for example, the system thermal controller may not execute a dummy workload. The maximum system workload threshold may be based on vendor specifications.

Method 400 typically starts block 415, where the system thermal controller may monitor system thermals. At decision block 420, the system thermal controller may determine whether the defined thermal event associated with the current system temperature below the minimal temperature threshold is intercepted. If the event is intercepted, then the "YES" branch is taken, and the method proceeds to block 425. If the event is not intercepted, then the "NO" branch is taken, and the method loops back to block 415 to continue monitoring the system thermals.

At block 425, the system thermal controller may determine a temperature deviance required to maintain the recommended minimal temperature threshold. For example, the system thermal controller may determine a difference between the current system temperature and the ASHRAE recommended minimal temperature based on the class of the device. For example, if the current temperature of the edge device, which is a class A1 device, is 14° C. and the minimum system temperature threshold for class A1 equipment is 15° C., then there is a 1° C. difference between the two values. The 1° C. may be referred to as the value of the temperature deviance.

The method may proceed to decision block 430 where the system thermal controller may determine whether there is a heater in the system. If there is a heater in the system, then the "YES" branch is taken, and the method proceeds to block 435. If there is no heater in the system, then the "NO" branch is taken, and the method proceeds to block 515 of FIG. 5. At block 435, the system thermal controller may determine the current health of the heater. The system thermal controller may determine the current health of the heater based on historical events. The system thermal controller may also query the heater controller for the current health of the heater. The method may proceed to method 500 of FIG. 5.

Figure 5:
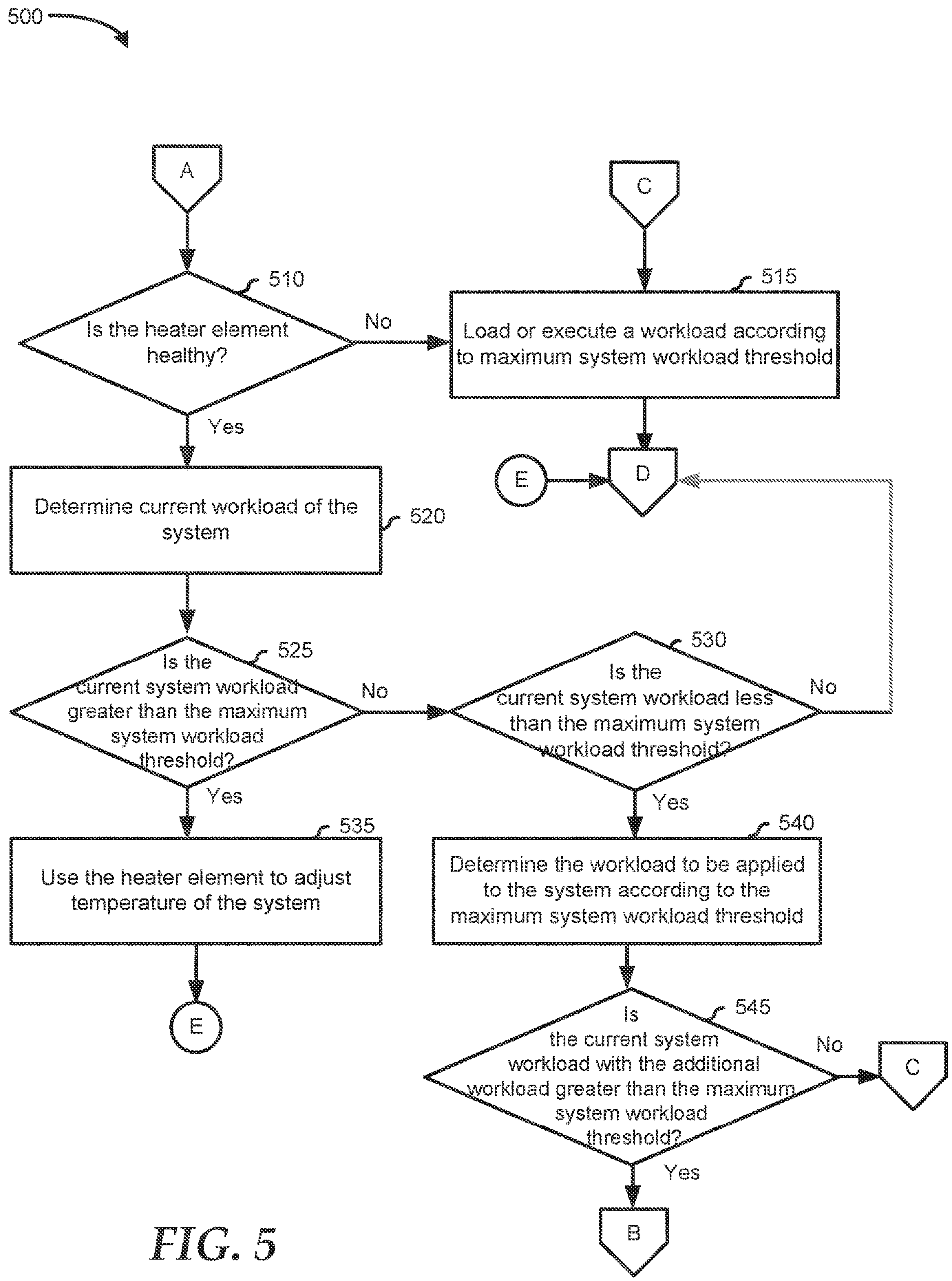

FIG. 5 shows a flowchart of method 400 which is a continuation of method 400 of FIG. 4. At decision block 510, the system thermal controller may determine whether the heater element is healthy. If the heater element is healthy, then the "YES" branch is taken, and the method may proceed to block 520. If the heater element is not healthy, then the "NO" branch is taken, and the method proceeds to block 515.

At block 515, the system thermal controller may determine the current system workload and load additional workload, such as a dummy workload, according to the maximum system workload threshold. For example, the system thermal controller may determine a size of the dummy workload to be loaded as configured above by the user, such that the current system workload and the dummy workload may not exceed the maximum system workload threshold. If adding the dummy workload to the system exceeds the maximum system workload threshold, then the additional workload will not be loaded or executed. Afterwards, the method proceeds to decision block 635 of FIG. 6. At block 520, the system thermal controller may determine the current workload of the system. The method proceeds to decision block 525.

At decision block 525, the system thermal controller may determine whether the current system workload is greater than the maximum system workload threshold. If the current system workload is greater than the maximum system workload threshold, then the "YES" branch is taken, and the method proceeds to block 535. If the current system workload is not greater than the maximum system workload threshold, then the "NO" branch is taken, and the method proceeds to decision block 530.

At decision block 530, the system thermal controller may determine whether the current workload is less than the maximum system workload threshold. If the current system workload is less than the maximum system workload threshold, then the "YES" branch is taken, and the method proceeds to block 540. If the current system workload is not less than the maximum workload threshold, then the "NO" branch is taken, and the method ends. At block 535, the system thermal controller may use the heater to adjust or increase the temperature of the system to the minimum system temperature threshold. The heater is used to adjust the temperature instead of the additional workload because the additional workload to the current workload may cause the device to exceed the maximum system workload threshold which may cause the device to have undesirable behavior. For example, the system thermal controller may heat the system until the system temperature reaches the minimum system temperature threshold.

At block 540, the system thermal controller may determine the workload, such as the dummy workload, to be applied to the system according to the maximum system workload threshold similar to block 515. As the workload of the device is increased, the temperature of the device may increase due to the increased power consumption. The system thermal controller may use table 1 above to determine power usage of the additional workload to meet the minimum system temperature threshold. For example, the system thermal controller may determine the additional workload to raise the temperature by 1° C. to 15° C.

At decision block 545, the method may determine whether the additional workload would increase the current workload to be greater than the maximum system workload threshold. If the current workload in addition to a dummy workload is greater than the maximum system workload threshold, then the "YES" branch is taken, and the method proceeds to block 605 of FIG. 6. If the current workload in addition to the dummy workload would not be greater than the maximum system workload threshold, then the "NO" branch is taken, and the method proceeds to decision block 610 of FIG. 6.

Figure 6:
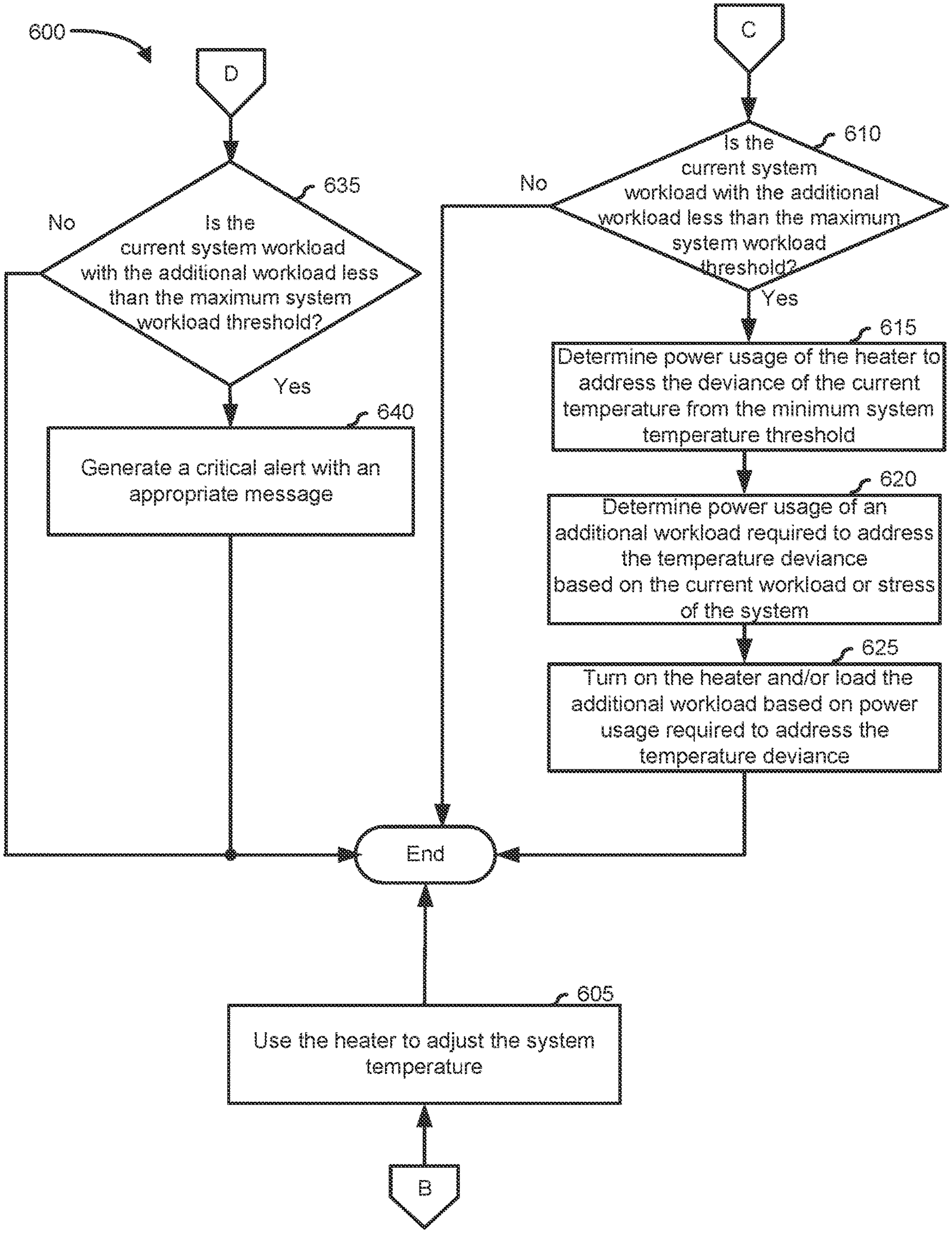

FIG. 6 shows a flowchart of method 600 which is a continuation of method 500 of FIG. 5. At block 605, the system thermal controller may use the heater to adjust the temperature of the system. For example, the system thermal controller may turn on the heater to heat the system until the system temperature reaches the minimum system temperature threshold. The system thermal controller may use table 2 above to determine what setting may be used, such as whether to use the low, medium, or high setting.

At decision block 610, the method may determine whether the additional workload would increase the current workload to be less than the maximum system workload threshold. If the current workload in addition to a dummy workload is less than the maximum system workload threshold, then the "YES" branch is taken, and the method proceeds to block 615. If the current workload in addition to the dummy workload would not be less than the maximum system workload threshold, then the "NO" branch is taken, and the method ends.

At block 615, the system thermal controller may determine the power usage of the heater that is required to address the deviance of the current system temperature from the minimum system temperature threshold. The system thermal controller may determine the power usage of the heater based on table 2 above. For example, if the heater is to be set to the low setting to address the temperature deviance based on the inlet temperature, then the power usage of the heater is PH1. The method may proceed to block 620.

At block 620, the system thermal controller may determine power usage of the additional workload, such as the dummy workload, required to address the deviance of current temperature from the minimum system temperature threshold. The power usage of the additional workload may be determined based on the current workload or stress of the system. The power usage of the additional workload may be determined based on table 1. For example, if the additional workload needed to address the temperature device is less than 10%, then the power usage of the additional workload is P1. The method may proceed to block 625.

At block 625, the system thermal controller may turn on the heater and/or load the additional workload based on the power usage determined that may be required to address the temperature deviance. The power usage of the heater and/or the additional workload in addition to the current system workload may not be greater than the maximum system power workload. The system thermal controller may compare the power usage determined in blocks 615 and 620 and may choose an option with less power consumption. For example, if the power usage of the additional workload determined in block 620 is greater than the power usage of the heater determined in block 615, then the system thermal controller may turn on the heater. In another example, if the power usage of the additional workload determined in block 620 is less than the power usage of the heater determined in block 615, then the system thermal controller may load the additional workload. The method may ends.

At decision block 635 the system thermal controller may determine whether the current system workload is less than the maximum system workload threshold. If the current system workload is less than the maximum system workload threshold, then the "YES" branch is taken, and the method proceeds to block 640. If the current system workload is not less than the maximum system workload threshold, then the "NO" branch is taken, and the method ends. At block 640, the system thermal controller may generate an alert with an appropriate message for the user. For example, the heater is not fully functional, and the additional workload added cannot meet the minimum system temperature limit. Afterwards, the method ends.

The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

As used herein, a hyphenated form of a reference numeral refers to a specific instance of an element and the unhyphenated form of the reference numeral refers to the collective or generic element. Thus, for example, information handling system "305-1" refers to an instance of a widget class, which may be referred to collectively as information handling systems "305" and any one of which may be referred to generically as an information handling system "305."

Although FIG. 4, FIG. 5, and FIG. 6 show example blocks of method 400, method 500, and method 600 in some implementations, method 400, method 500, and method 600 may include additional blocks, fewer blocks, different blocks, or differently arranged blocks than those depicted in FIG. 4, FIG. 5, and FIG. 6. Those skilled in the art will understand that the principles presented herein may be implemented in any suitably arranged processing system. Additionally, or alternatively, two or more of the blocks of method 400, method 500, and method 600 may be performed in parallel. For example, blocks 615 and 620 of method 600 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

monitoring an information handling system, by a processor, to detect whether a current temperature of the information handling system is below a minimum system temperature threshold;

if the current temperature is below the minimum system temperature threshold, then determining whether the information handling system includes a heater;

if a current system workload of the information handling system is greater than a maximum system workload threshold and the heater is healthy, then using the heater to increase the current temperature of the information handling system to the minimum system temperature threshold;

if the current system workload of the information handling system is less than the maximum system workload threshold and the heater is healthy, then determining an additional workload according to the maximum system workload threshold;

if the current system workload of the information handling system with the additional workload is less than the maximum system workload threshold, then determining a first power usage of the heater to address a deviance of a current system temperature from the minimum system temperature threshold and a second power usage of the additional workload to address the deviance of the current system temperature from the minimum system temperature threshold; and turning on the heater and loading the additional workload based on the first power usage and the second power usage respectively, wherein the first power usage and the second power usage is less than a maximum system power workload.

2. The method of claim 1, further comprising determining a power consumption of a dummy workload.

3. The method of claim 1, further comprising determining the current system workload when a dummy workload is added.

4. The method of claim 1, further comprising determining a difference between the current temperature and the minimum system temperature threshold.

5. The method of claim 1, further comprising if the current system workload is less than the maximum system workload threshold, then determining the additional workload to increase the current temperature to the minimum system temperature threshold.

6. The method of claim 1, further comprising if the heater is not healthy, then using the additional workload to increase the current temperature to the minimum system temperature threshold.

7. The method of claim 1, further comprising if the current system workload including a dummy workload is less than the maximum system workload threshold and the heater is not healthy, then generating a critical alert.

8. An information handling system, comprising:

a processor; and a memory storing code that when executed causes the processor to perform operations including:

monitoring the information handling system to detect whether a current temperature of the information handling system is below a minimum system temperature threshold;

if the current temperature is below the minimum system temperature threshold, then determining whether the information handling system includes a heater;

if a current system workload of the information handling system is greater than a maximum system workload threshold and the heater is healthy, then using the heater to increase the current temperature of the information handling system to the minimum system temperature threshold;

if the current system workload of the information handling system is less than the maximum system workload threshold and the heater is healthy, then determining an additional workload according to the maximum system workload threshold;

if the current system workload of the information handling system with the additional workload is less than the maximum system workload threshold, then determining a first power usage of the heater to address a deviance of a current system temperature from the minimum system temperature threshold and a second power usage of the additional workload to address the deviance of the current system temperature from the minimum system temperature threshold; and turning on the heater and load the additional workload based on the first power usage and the second power usage respectively, wherein the first power usage and the second power usage is less than a maximum system power workload.

9. The information handling system of claim 8, wherein the operations further comprise determining a power consumption of the additional workload.

10. The information handling system of claim 8, wherein the operations further comprise determining the current system workload with the additional workload.

11. The information handling system of claim 8, wherein the operations further comprise determining a difference between the current temperature and the minimum system temperature threshold.

12. The information handling system of claim 8, wherein the operations further comprise if the current system workload including a dummy workload is greater than the maximum system workload threshold and the heater is healthy, then using the heater to increase the current temperature to the minimum system temperature threshold.

13. The information handling system of claim 8, wherein the operations further comprise if the heater is not healthy, then using the additional workload to increase the current temperature to the minimum system temperature threshold.

14. The information handling system of claim 8, wherein the operations further comprise if the current system workload with a dummy workload is less than the maximum system workload threshold and the heater is not healthy, then generating a critical alert.

15. A non-transitory computer-readable medium to store instructions that are executable to perform operations comprising:

monitoring an information handling system to detect whether a current temperature of the information handling system is below a minimum system temperature threshold;

if the current temperature is below the minimum system temperature threshold, then determining whether the information handling system includes a heater;

if a current system workload of the information handling system is greater than a maximum system workload threshold and the heater is healthy, then using the heater to increase the current temperature of the information handling system to the minimum system temperature threshold;

if the current system workload of the information handling system is less than the maximum system workload threshold and the heater is healthy, then determining an additional workload according to the maximum system workload threshold;

if the current system workload of the information handling system with the additional workload is less than the maximum system workload threshold, then determining a first power usage of the heater to address a deviance of a current system temperature from the minimum system temperature threshold and a second power usage of the additional workload to address the deviance of the current system temperature from the minimum system temperature threshold; and turning on the heater and load the additional workload based on the first power usage and the second power usage respectively, wherein the first power usage and the second power usage is less than a maximum system power workload.

16. The non-transitory computer-readable medium of claim 15, wherein the operations further comprise determining a power consumption of the additional workload.

17. The non-transitory computer-readable medium of claim 15, wherein the operations further comprise determining the current system workload including the additional workload.

18. The non-transitory computer-readable medium of claim 15, wherein the operations further comprise determining a difference between the current temperature and the minimum system temperature threshold.

19. The non-transitory computer-readable medium of claim 15, wherein the operations further comprise if the current system workload including a dummy workload is greater than the maximum system workload threshold and the heater is healthy, then using the heater to increase the current temperature to the minimum system temperature threshold.

20. The non-transitory computer-readable medium of claim 15, wherein the operations further comprise if the heater is not healthy, then using the additional workload to increase the current temperature to the minimum system temperature threshold.

* * * * *